(12) United States Patent
Courtright

(10) Patent No.: US 8,590,787 B1
(45) Date of Patent: Nov. 26, 2013

(54) SYSTEMS AND METHODS FOR TRANSACTIONS WITH A HEADLESS AUTOMATED TELLER MACHINE OR POINT OF SALE DEVICE

(71) Applicant: United Services Automobile Association (USAA), San Antonio, TX (US)

(72) Inventor: Christopher P. Courtright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/658,270

(22) Filed: Oct. 23, 2012

Related U.S. Application Data

(63) Continuation of application No. 13/329,805, filed on Dec. 19, 2011, now Pat. No. 8,292,170, which is a continuation of application No. 12/504,799, filed on Jul. 17, 2009, now Pat. No. 8,083,141.

(51) Int. Cl.
*G06K 15/00* (2006.01)
(52) U.S. Cl.
USPC .......................... 235/383; 235/380; 235/492
(58) Field of Classification Search
USPC ................ 235/383, 379, 380, 375, 487, 492;
705/41–44
See application file for complete search history.

(56) References Cited

U.S. PATENT DOCUMENTS

| | | | |
|---|---|---|---|
| 5,992,570 A | 11/1999 | Walter et al. | |
| 6,405,182 B1 | 6/2002 | Cuervo | |
| 2003/0005088 A1* | 1/2003 | Remer | 709/220 |
| 2004/0122771 A1* | 6/2004 | Celi et al. | 705/43 |
| 2008/0120233 A1 | 5/2008 | Foss et al. | |
| 2009/0063340 A1* | 3/2009 | Chiang | 705/41 |
| 2009/0108015 A1 | 4/2009 | Kreamer | |
| 2009/0287576 A1* | 11/2009 | Suzuki | 705/16 |

OTHER PUBLICATIONS

Smith, Ken. "Mobile phone withdraws cash from Danish ATM," www.eyefortravel.com, Apr. 30, 2002, 4 pgs.

* cited by examiner

*Primary Examiner* — Edwyn Labaze
(74) *Attorney, Agent, or Firm* — Brooks, Cameron & Huebsch, PLLC

(57) ABSTRACT

Systems and methods for performing a transaction with a headless point-of-sale or automated teller machine (ATM) device are disclosed. A card having a display and radio frequency (RF) communications module may be authenticated with a headless point-of-sale device using a short-range RF communications link. Transaction information may be provided to the display of the card from the headless point-of-sale device. A customer may confirm the transaction at the card using a touch-sensitive input area. The headless point-of-sale device may then provide the transaction information to a transaction processor for processing and verification. Where the headless device is a headless ATM, the card may be authenticated to the ATM and transaction information may be entered and displayed on the card. A cardholder may authenticate with the ATM by entering, e.g., a PIN number and funds may be dispensed to the cardholder upon verification of the PIN.

20 Claims, 6 Drawing Sheets

US 8,590,787 B1

SYSTEMS AND METHODS FOR TRANSACTIONS WITH A HEADLESS AUTOMATED TELLER MACHINE OR POINT OF SALE DEVICE

CROSS-REFERENCE TO RELATED APPLICATIONS

This application is a continuation of U.S. patent application Ser. No. 13/329,805, filed on Dec. 19, 2011, now U.S. Pat. No. 8,292,170, which is a continuation Ser. No. 12/504,799, filed on Jul. 17, 2009, now U.S. Pat. No. 8,083,141, which is herein incorporated by reference.

BACKGROUND

The process by which users withdrawal currency from an automated teller machine (ATM) has remained the same for a considerably long time. The user first approaches the ATM, insert his/her card into the card reader, enters a PIN number, responds to the prompts on the screen, and receives currency and a receipt. In addition to being located at financial institutions, ATM machines may be found at most supermarkets, convenience stores and travel centers.

However, the annual cost associate with maintaining an ATM can be over $40,000 per year. Much of the cost is attributable to security required to maintain a safe environment near the ATM machine. Also, the input devices of the ATM (e.g., the touch screen display, keypad, card reader, etc.) requirement repair and replacement to insure proper working conditions. Thus, the traditional ATM machine can be expensive to operate.

SUMMARY

Systems and methods for performing a transaction with a headless point-of-sale or automated teller machine (ATM) device are disclosed. A card having a display and radio frequency (RF) communications module may be authenticated with a headless point-of-sale device using a short-range RF communications link. Transaction information may be provided to the display of the card from the headless point-of-sale device. A customer may confirm the transaction at the card using a touch-sensitive input area. The headless point-of-sale device may then provide the transaction information to a transaction processor for processing and verification. A transaction may then be completed at the headless point-of-sale device.

In some implementations, where the headless device is a headless ATM, the card may be authenticated to the ATM. Transaction information may be entered and displayed on the card. A cardholder may authenticate with the ATM by entering, e.g., a PIN number and funds may be dispensed to the cardholder upon verification of the PIN.

This summary is provided to introduce a selection of concepts in a simplified form that are further described in the detailed description section. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
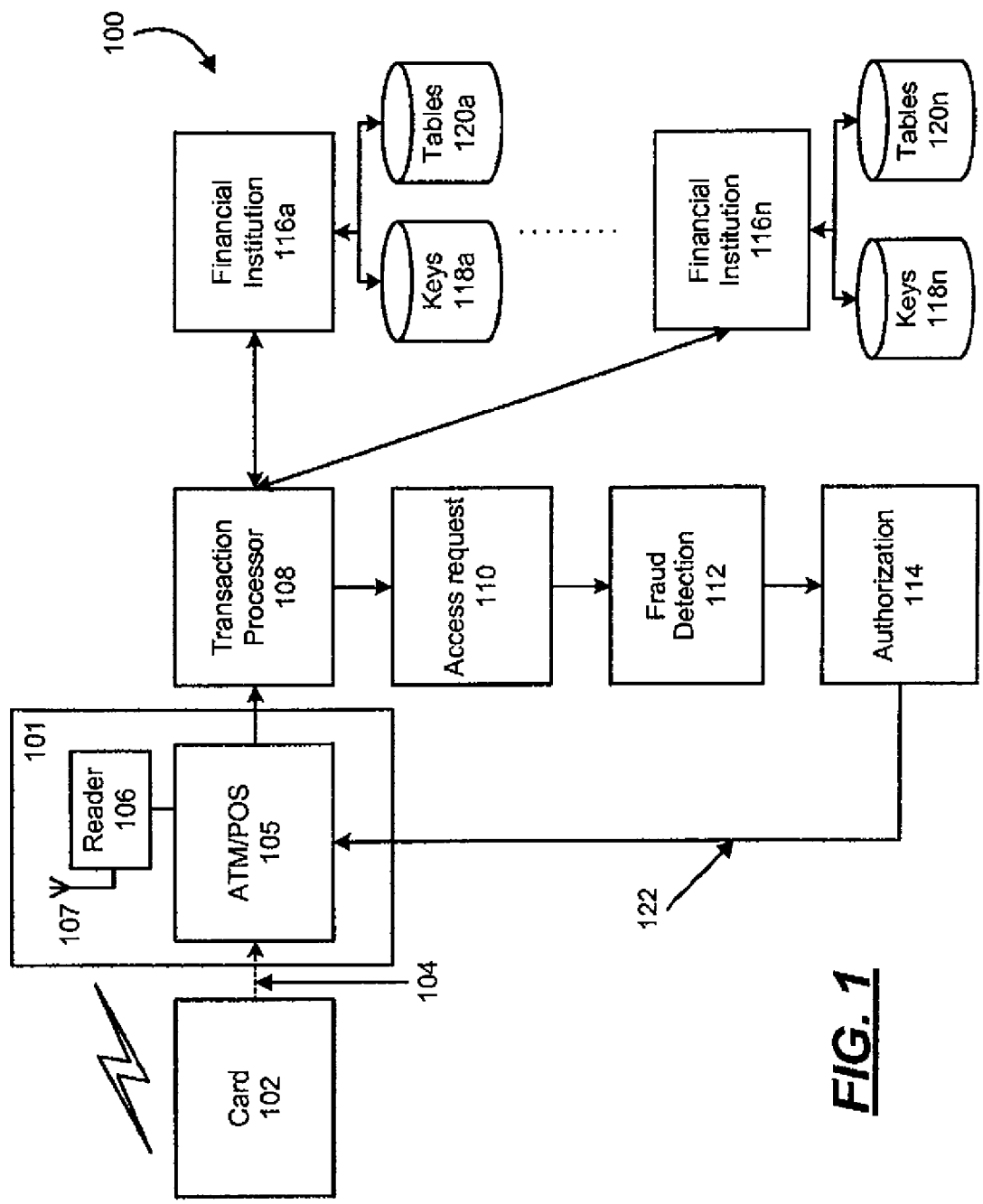
FIG. 1 illustrates an example financial transaction system.

FIG. 1 illustrates an example financial transaction system 100. A population of user cards is represented herein by cards 102. The cards 102 may be configured as credit cards, debit cards, gift cards, loyalty cards, ATM cards, and other types in these general formats, as described below. Each card 102 may include a magnetic stripe that includes tracks 1, 2 and/or 3. The magnetic stripe may include a primary account number (PAN), a name, an expiration date, a service code, discretionary data (e.g., a Pin Verification Key Indicator (PVKI), Pin Verification Value (PVV), Card Verification Value or Card Verification Code (CVV, CVK, CVC1, CVV1), a Longitudinal redundancy check (LRC), etc. In a typical 16-digit credit/debit card personal account number (PAN) [XXXX XXXX XXXX XXXX], the first digit is a card system identifier (VISA/MC/AMEX), the next 5-digits are a bank identification number (BIN), the next 9-digits are the customer user account number, and the longitudinal redundancy check character (LRC).

The card 102 may be a contactless smart card that includes embedded integrated circuits such that the card 102 may communicate with a card reader 106 through RFID induction technology. As such, the card 102 need only be in close proximity to an antenna 107 to complete a transaction with an automated teller machine/point-of-sale device (ATM/POS) 105. The standard for contactless smart card communications is ISO/IEC 14443, which defines two types of contactless cards ("A" and "B"), that allows for communications at distances up to 10 cm. In some implementations, the card 102 may use a built-in inductor to capture some of the incident radio-frequency interrogation signal, rectify it, and use it to power the card's electronics. The card 102 may also include a user interface through which information may be presented to, or received from, a user. A more detailed description of the contactless card is provided with reference to FIG. 2.

The card 102 may also be used as an electronic wallet. The integrated circuits in the card 102 may be loaded with funds, which can be spent in parking meters, vending machines, merchants, etc. Cryptographic protocols protect the exchange of money between the smart card and the accepting machine. No connection to an issuing bank is necessary in such a configuration, so the holder of the card can use it regardless of the holder being the owner of the card and/or account associated with the card. Thus, the card may be a "Bearer Instrument" for making funds portable with the card 102. As such, the card 102 could be used as an anonymous, portable vehicle for funds. This could be leveraged by a trusted courier service or other private agency engaged to deliver the card 102.

A merchant 101 may have the ATM/POS device 105 at a location that may be configured as "headless" device (i.e., no display). The ATM/POS 105 may include a CPU to control transaction devices, a magnetic and/or chip card reader to identify the customer, a secure cryptoprocessor, and, optionally, a printer to provide the customer with a record of their transaction. In some implementations, the ATM/POS 105 may lack a physical input device (e.g., a keypad) and rely solely on the card 102 to send and receive information to the user. Many ATMs include an architecture similar to a general purpose computing device, as described with reference to FIG. 7. For example, many ATMs/POS devices use operating systems such as MICROSOFT WINDOWS and LINUX or other dedicated operating systems specifically designed for the device.

In some implementations, the ATM/POS 105 may include, or be operably connected to, the reader 106 that may have the RF antenna 107 in some implementations. The reader 106 provides an interrogation signal for powering the card 102 when the card 102 is positioned in proximity to the reader 106. The interrogating signal may power the card 102 thereby initiating operation of the card 102 to perform a transaction.

In some implementations, the reader 106 may be a more general purpose wireless communication system. In such implementations, the reader 106 may be configured to communicate with devices using such protocols and standards as IEEE 802.11x, Bluetooth, IEEE 802.16, among others. As such, the reader 106 may communicate with wireless devices such as handsets, laptop personal computing devices and other mobile computing devices, etc.

In some implementations, the reader 106 may be a contact plate on which the card 102 is placed to power the card 102 to perform a transaction. In some implementations, the reader 106 and ATM/POS 105 may be a surface computing device, such as MICROSOFT SURFACE. The card 102 may communicate with the reader 106 by placing it on a surface to active the card's electronics.

As part of the transaction process, the ATM/POS 105 may read magnetic swipe data 104 that may include, a user identification ISO/IEC and/or Track 1/2/3 data. In some implementations, the above information may be received from the card 102 or other handheld wireless device using the reader 106. The information may be communicated together with other details of the transaction (e.g., an amount, type of transaction, merchant/bank ID, etc.) to a transaction processor 108 to authenticate the user account and approve the transaction.

The transaction processor 108 includes an account access request process 110, a fraud detection process 112, and an authorization process 114. These may also be used to administer inter-partner data exchanges, such as when transaction data and requests are bridged bi-directionally between the payment infrastructure (e.g., the ATM/POS 105) and one or more financial institutions 116a . . . 116n.

Each financial institution 116a . . . 116n that provides cards 102 may maintain a respective customer database 118a . . . 118n containing information for each customer such as a residence/mailing address (street, city, state and ZIP code), contact information (telephone, e-mail, etc.), social security number, and security information (a secret password or passphrase, unique image, or gesture enrolled by the customer as an answer(s) to security question(s)). Each financial institution 116a . . . 116n may maintain a respective ledger balance 120a . . . 120n to track transactions and balances for each customer account to determine an amount of funds on deposit, loan balances, etc.

The financial institutions 116a . . . 116n may authenticate the user based on information contained in the message 104 and information contained in the customer databases 118a . . . 118n and ledger balances 120a . . . 120n. If the transaction is approved, an authorization code 122 is returned to the ATM/POS 105 by the payment processor authorization process 114 to enable the user to perform a transaction on the ATM/POS 105. Thus, in the system 100, transactions made at the ATM/POS 105 may be processed as ATM transactions.

Figure 2:
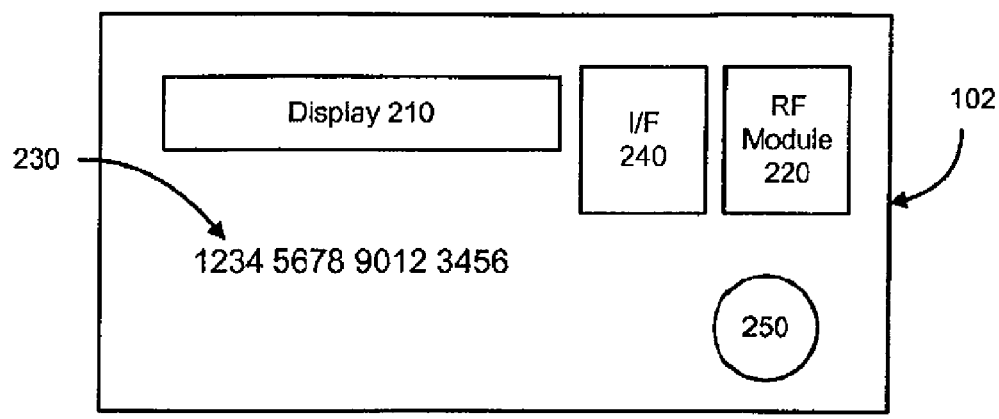
FIG. 2 depicts the front surface of an exemplary contactless card in accordance with implementations herein.

FIG. 2 depicts the front surface of an exemplary contactless card in accordance with implementations herein. The card 102 may have any shape and may be formed having a size similar to a credit card (i.e., as set in ISO/IEC 7810, which defines the dimensions as 85.60×53.98 mm), a SIM card (i.e., ID-000 which is 25×15 mm), or as a key fob having varying dimensions. The card 102 may include a display area 210, an RF module 220 for conducting a RF transaction, an embossed card number 230, a network interface 240, a battery 250, and a magnetic stripe on the back (not shown).

The display area 210 may be a touch-sensitive display to receive inputs from a user and to display information to the user. The touch-sensitive display may be one or a combination of the following types: resistive, capacitive, dispersive signal, acoustic pulse, electronic ink (e-ink), etc. The display area 210 may be rendered operational when placed into communication with the ATM/POS 105. A resistive display may include a panel that is covered with a conductive and a resistive metallic layer. The two layers are held apart by spacers, and a scratch-resistant layer is placed on top. An electrical current may runs through the two layers while the display area 210 is operational. When a user touches the screen, the two layers make contact in that exact spot. The change in the electrical field is noted and the coordinates of the point of contact are calculated. Once the coordinates are known, a driver 320 (see, FIG. 3) translates the touch into something that the card 102 understands as a position.

In the capacitive system, a layer that stores electrical charge is placed on the display area 210. When a user touches the display area 210 with his or her finger, some of the charge is transferred to the user, so the charge on the capacitive layer decreases. This decrease is measured in circuits located at each corner of the display area 210. From the relative differences in charge at each corner, the card 102 may calculate exactly where the touch event took place and then relays that information to the driver.

In an acoustic pulse system, two transducers (one receiving and one sending) are placed along the x and y axes of the display area 210. Also placed on the display area 210 are reflectors that reflect an electrical signal sent from one transducer to the other. The receiving transducer is able to tell if the wave has been disturbed by a touch event at any instant, and can locate it accordingly.

Electronic ink displays utilize microcapsules, each of which contains positively charged white particles and negatively charged black particles suspended in a clear fluid. When a negative electric field is applied, the white particles move to the top of the microcapsule where they become visible to the user. This makes the surface appear white at that spot. At the same time, an opposite electric field pulls the black particles to the bottom of the microcapsules where they are hidden. By reversing this process, the black particles appear at the top of the capsule, which now makes the surface appear dark at that spot. To form an e-ink electronic display, the ink is printed onto a sheet of plastic film that is laminated to a layer of circuitry. The circuitry forms a pattern of pixels that can then be controlled by the display driver 320.

Figure 3:
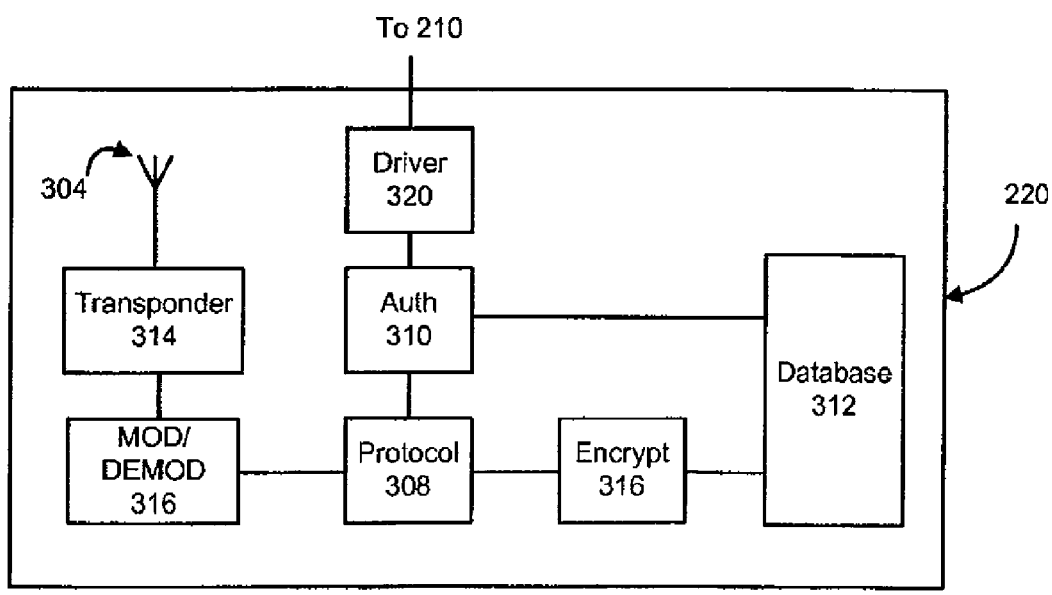
FIG. 3 shows a block diagram of exemplary RF module.

FIG. 3 shows a block diagram of exemplary RF module 220. The module 220 may include any conventional RF circuitry capable of communicating using Radio Frequency (RF) transmission. The module 220 may also be electrically connected to receive inputs from the display area 210 using a suitable display driver 320. The RE module 220 may include an antenna 304 for receiving an interrogation signal from RED reader 106 via antenna 107. The antenna 304 may be in communication with a transponder 314. The transponder 314 may be a 13.56 MHz transponder compliant with the ISO/IEC 14443 standard, and the antenna 304 may be of the 13 MHz variety.

The transponder 314 may be in communication with a transponder compatible modulator/demodulator 306 configured to receive the signal from the transponder 314 and configured to modulate the signal into a format readable by any later connected circuitry. Further, the modulator/demodulator 306 may be configured to format (e.g., demodulate) a signal received from the later connected circuitry in a format compatible with the transponder 314 for transmitting to the reader 106 via the antenna 304. For example, where the transponder 314 is of the 13.56 MHz variety, the modulator/demodulator 306 may be ISO/IEC 14443-2 compliant.

The modulator/demodulator 306 may be coupled to a protocol/sequence controller 308 for facilitating control of the authentication of the signal provided by the reader 106, and for facilitating control of the sending of the module account number. In this regard, protocol/sequence controller 308 may be any suitable digital or logic driven circuitry capable of facilitating determination of the sequence of operation for the module 220 inner-circuitry. For example, protocol/sequence controller 308 may be configured to determine whether the signal provided by the reader 106 is authenticated, and thereby providing to the reader 106 the account number stored on module 220.

To authenticate the signal, the protocol/sequence controller 308 may be further in communication with authentication circuitry 310 for facilitating authentication of the signal provided by the reader 106. Similarly, the authentication circuitry 310 may facilitate the sending and receipt of information to and from the display area 210 through the display driver 320. The authentication circuitry may be further in communication with a non-volatile secure memory database 312. Secure memory database 312 may be any suitable elementary file system such as that defined by ISO/IEC 7816-4 or any other elementary file system allowing a lookup of data to be interpreted by the application on the chip. The database 312 may be any type of database, such as relational, hierarchical, object-oriented, and/or the like. The database 312 may be organized in any suitable manner, including as data tables or lookup tables.

Association of certain data in the database 312 may be accomplished either manually or automatically. Automatic association techniques may include, for example, a database search, a database merge, GREP, AGREP, SQL, and/or the like. The association may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged based on the class data in the key field. The data corresponding to the key field in each of the merged data tables may be the same. However, data tables having similar, though not identical, data in the key fields may also be merged by using AGREP, for example.

The data received from the reader 106 or the database 312 may be used by the protocol/sequence controller 308 for data analysis and used for management and control purposes, as well as security purposes. The authentication circuitry 316 may authenticate the signal provided by reader 106 by association of the signal to authentication keys stored on database 312. The authentication circuitry 316 may be in further communication with encryption circuitry 316 which may encrypt or decrypt the reader 106 signal or the data (e.g., account number, user identifier, device identifier, etc.) returned from the database 312 prior to transmitting the data. The encryption circuitry 316 may use keys stored on the database 312 to perform encryption and/or decryption of signals sent to or from the RFID reader 106.

In addition, the protocol/sequence controller 308 may be in communication with the database 312 for storing at least one of module 220 account data, a unique module identification code, user identification code, or transaction device identifier, etc. The protocol/sequence controller 308 may be configured to retrieve the account number from database 312 as desired. The account data and/or unique device identification code stored on the database 312 may be encrypted prior to storage.

Thus, where the protocol/sequence controller 308 retrieves the account data, and or unique transaction device identifier, or the like, from the database 312, the data may be encrypted by the encryption circuit 316 when being provided to reader 106. Further, the data stored on the database 312 may include, for example, an unencrypted unique module 220 identification code, a user identification ISO/IEC, Track 1/2/3 data, as well as specific application applets. The data may additionally be stored in the database 312 in Track 1/Track 2/Track 3 format and may also be in Track 1/Track 2/Track 3 format when provided to the reader 106

In an exemplary operation, the module 220 is placed in proximity to, or physically on, the reader 106 when the user wishes to conduct a transaction. The user simply positions the module 220 at a certain distance from the reader 106 until the reader 106 acknowledges that the information contained in the module 220 has been received. The reader 106 then utilizes at least a portion of the information provided by module 220 (such as, a user's account number associated with the transaction device) to complete the transaction. The reader 106 may receive the account information from the module 220 and verify the account information authenticity prior to forwarding the account information to the transaction processor 108.

Inputs may be received in the display area 210 and interpreted by the display driver 320, as noted above. The inputs may be input to the authentication circuit 310 and the protocol/sequence controller 308 configured to send and receive information to and from the display area 210 to the modulator/demodulator 306 and the antenna 304 to allow a user to interact with the card 102 during a transaction. The interaction may allow the user to perform a transaction at the ATM/POS 105 (or other point of sale device) to withdraw cash, pay for goods and services, etc., using the card 102.

The display 210 may show multiple images on it, one of which may be a pre-enrolled response to a security question that the customer touches in order to provide authentication. As such, the financial institution may randomize images, gestures, etc and display several on the card for the customer to touch or select in order to prove that they are the correct owner/bearer of the card. If an incorrect response is provided, then the financial institution can remotely wipe the card. Thus, a "wipe on sight" command targeted at stolen cards could be broadcast to all headless terminals so that if the card was placed in proximity to any device, it would be disabled and the location reported to the financial institution or law enforcement agencies. This would also facilitate a time-to-live feature for the cards to self-expire as well.

In some implementations, the card 102 may be a "one time use" card where the card can have only one attempt at authentication and if it fails, it would disable itself, rendering it useless for future transactions.

The embossed card number 230 may be a conventional raised card number and may be optional. Having the embossed card number 230 allows the card to be used as a conventional credit/debit/ATM card where a merchant can verify the card number with magnetic swipe information at the point of sale.

The network interface 240 may implement one or more connections standards. Examples include IEEE 802.11 series, Bluetooth, IEEE 802.16 series, among others. Further examples of communication standards are Global System for Mobile Communications (GSM) network, an Internet Protocol (IP) network, a Wireless Application Protocol (WAP) network, a WiFi network, or local area network (LAN), BLUETOOTH, as well as various combinations thereof. Other conventional and/or later developed wired and wireless networks may also be used. The network interface may utilize components within the RF module 220 to link to an external wireless network infrastructure.

The battery 250, if provided, may be comprised of a monolithic electrochemical cell having a lithium-containing cathode, a carbon anode, and a porous polymer separator infused with electrolyte solution. The cell has a thickness of less than 0.7 mm, such that it fits within the card 102.

Figure 4:
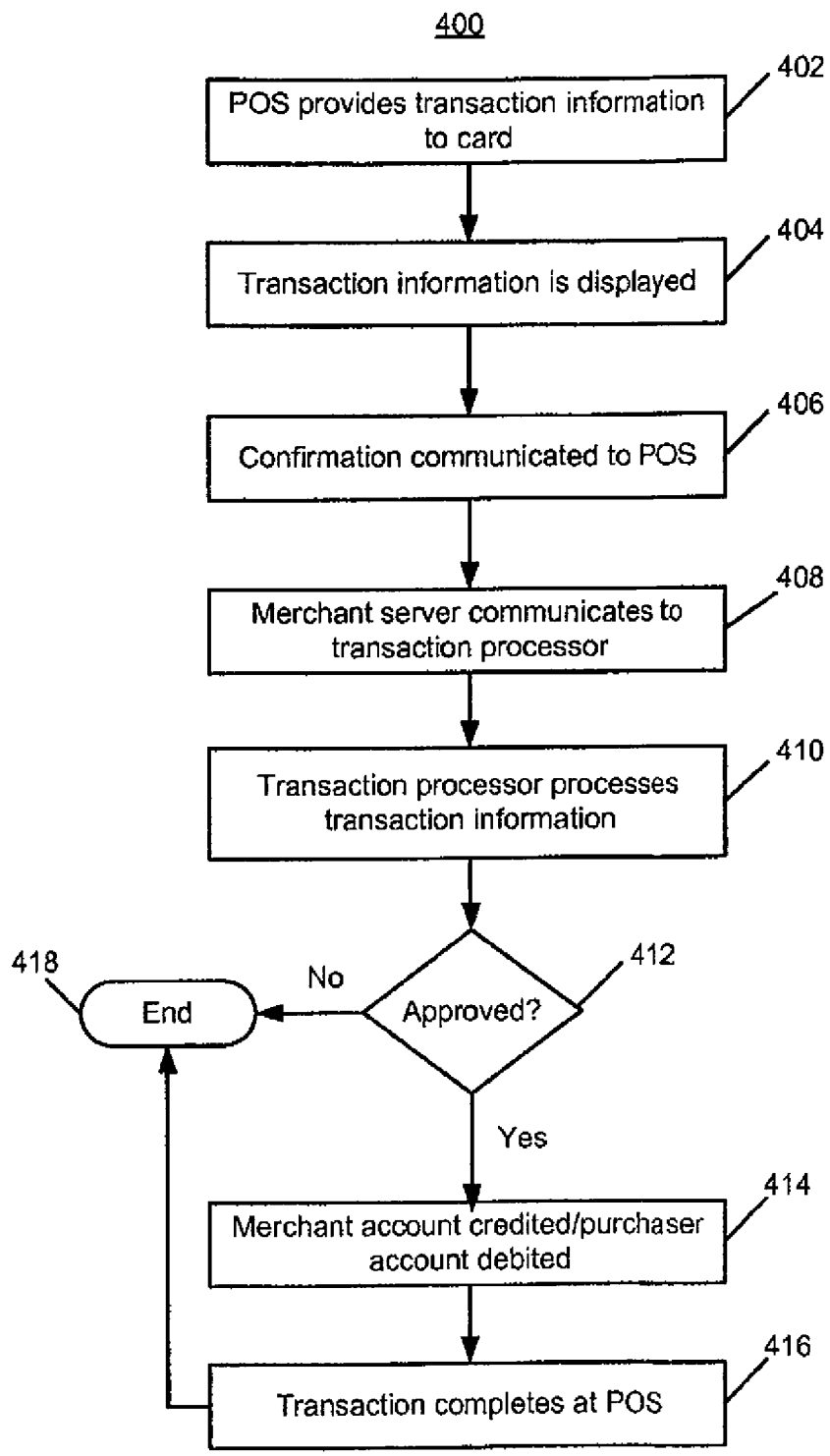
FIG. 4 shows an example process for conducting a transaction at an ATM/POS device using the card of FIG. 2.

In accordance with some implementations, the card 102 may have many configurable uses, as described in FIG. 6 below. In one configuration, the card 102 may be used to make purchases from a merchant 101 at a POS device 105. FIG. 4 shows an example process 400 for conducting a transaction at an ATM/POS device 105 using the card 102. The merchant 101 may receive a payment to complete a transaction for goods/services from a customer in possession of the card 102. The operational flow may begin after the customer presents merchandise at the point-of-sale device (POS) 105 for payment and establishes communication between the card 102 and the reader 106.

At 402, the POS device 105 provides transaction information to the card 102. For example, using an ISO 14443 near field effect communication technique, a communications link may be established between the reader 106 of the point-of-sale device 105 and the card 102. An application running on the card 102 may receive transaction information from the merchant 101.

At 404, the application running on the card 102 receives the transaction information, which is displayed on the card. The customer making the transaction may view the transaction information, including, but not limited to the merchant name, a transaction categorization (e.g. groceries, gasoline, etc.) and an amount. A transaction ID may be provided, which is a unique identifier of the transaction between the merchant 101 and the customer holding the card 102.

At 406, the payment to the merchant is authorized using the application on the card 102 and the touch screen display 210. The application may include a "send" or "purchase" option that may be selected by the customer to indicate that the transaction is authorized for payment to the merchant 101. The authorization may include associated with the customer, Track 1 and Track 2 information, etc. in order to provide the transaction processor 108 enough information to complete the transaction.

At 408, a merchant server computing device communicates with the transaction processor 108 to commence the transaction. At 410, the transaction processor 108 contacts the customer's bank (e.g., 116a) to process transaction information. When the bank 116a verifies the customer's funds, an approval determination is made at 412. If the transaction is not approved at 412, then the process ends at 418. If the transaction is approved at 412, then at 414, the transaction amount is credited to a merchant financial account at a merchant bank (e.g. 116n). The transaction amount and any transaction fees are debited from the customer's account at the customer's bank 116a. In accordance with some implementations, the transaction is processed through the Federal Reserve's Automated Clearing House (ACH). At 416, the transaction is completed at the POS 105 and the process ends at 418. The financial institution may route the transaction through the least cost option based on the customer preference or negotiated service level for the type of transaction being done. A financial institution may choose to have some transactions done in an overnight batch through the ACH network instead of a higher cost real time funds transfer.

In accordance with a variation of the operational flow 400, the card 102 may be configured as a specific purpose payment instrument. For example, a card 102 may be configured to be used only for a particular product, service, merchant, time, etc. In accordance with implementations of this variation of the operational flow 400, the card 102 may display its intended use (e.g., "gas card") in the display area 210. Thus, when the POS 105 provides transaction information to card at 402, an application on the card may determine if the transaction information is of a type for which the card 102 may be used. If not, rather than displaying transaction information at 44, a card 102 may display a message to the user that the purchase cannot be completed because the card is not authorized for such purchases. As such, a gas card could not be used for purchases at electronics store.

In accordance with another variation of the operational flow 400, the ATM/POS 105 may print tickets, coupons, discounts, etc., at 416 as part of the transaction. In some implementations, the tickets, coupons, discounts, etc. may be communicated to the card 102 and stored therein. To use the tickets, coupons, discounts etc., the user may present the card 102 and display such tickets, coupons, discounts, etc. in the display area 210 of the card 102.

In accordance with some implementations, the card 102 may be configured to access funds at an ATM in accordance with a pre-authorization. For example, a user may wish to send funds to a cardholder bearing the card 102. The cardholder may access the funds at any ATM/POS 105. In another example, the user may wish to pre-authorize a withdraw amount using the card 102. As such, user may use the card 102 to make withdraw up to a preauthorized maximum withdrawal amount.

Figure 5:
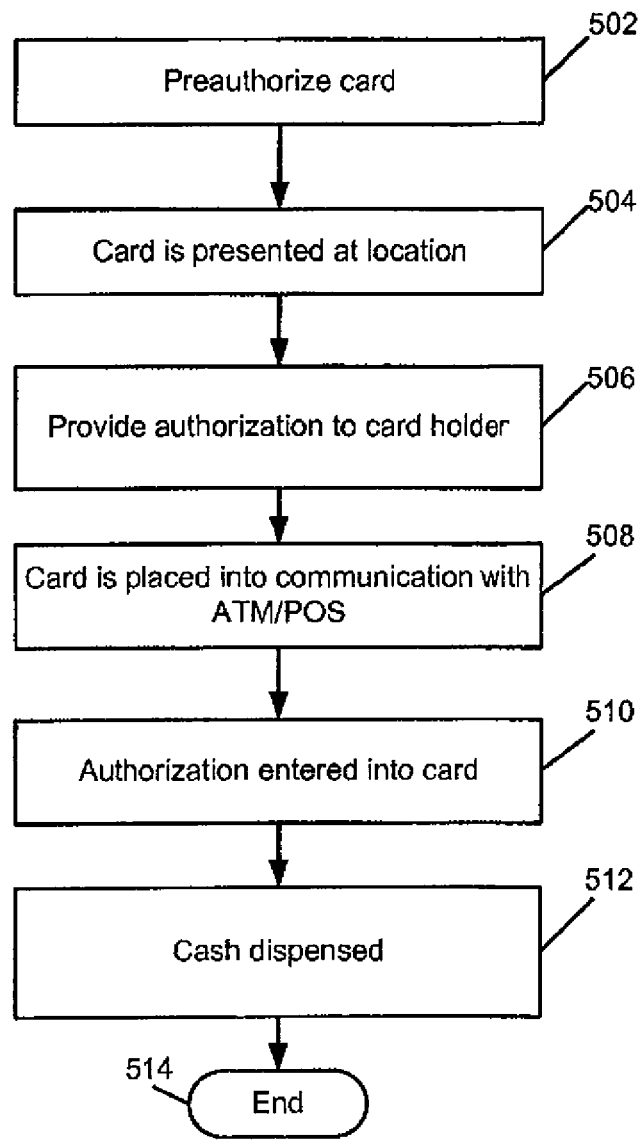
FIG. 5 shows another example process for conducting a transaction at an ATM/POS device using the card of FIG. 2.

FIG. 5 shows an example process 500 for conducting a transaction at an ATM/POS device 105 using the card 102. At 502, the card 102 is preauthorized. For example, the card 102 may be preauthorized to access funds up to an amount, e.g. $100. In addition, the preauthorization may specify a location where the card 102 may be used. The location may be determined in advance in accordance with a destination of the user (e.g., the ATM/POS 105 near work) or a location of the cardholder (e.g., an ATM/POS 105 near the location of the cardholder). The former option has the effect of limiting the amount of funds that the user may withdraw using the card 102. A financial services provider may provide a lookup function on a website whereby the user may login, authorize the card 102, and select location where the authorization is valid.

At 504, the card is presented at the preauthorized location. At 506, the authorization is provided to the cardholder. For example, the authorization may be an alphanumeric string (e.g. a PIN number) provided to the cardholder. If the user preauthorized his or her own card 102, the process at 506 may be skipped. At 508, the card 102 is placed into communication with the ATM/POS 105. Using the ISO 14443 near field effect communication capabilities of the card 102, a communications link may be established between the ATM/POS 105 and the card 102.

At 510, the authorization provided at 506 (or set by the user) may be entered into the card using the touch screen display of the card 102. The authorization may be communicated to the ATM/POS 105, which may then access the ATM network as described above with regard to FIG. 4 to authorize the transaction at the user's bank (e.g., 116*a*). Once an authorization is provided to the ATM/POS 105 from the user's bank, funds are dispensed at 512. The process then ends at 514.

In accordance with a variation of the operational flow 500, the authorization may be provided with a time to live value. For example, the card 102 maybe authorized for a predetermined period of time at the location before the authorization will become invalid. If the funds were not accessed at ATM/POS 105 within that predetermined period of time, then the funds would become unavailable. In some implementations, the authorization may be a "not to be used between this time" capability in addition to time to live. For example, the cardholder may not buy alcohol between 12:00 a.m. and 9:00 a.m. local time.

In accordance with some implementations, the card 102 may be used as a shopping aid. In such implementations, card 102 may be preloaded with a shopping list, such as a grocery list. As a user selects items on the list, the user may tap the card 102 on a reader 106 or enter on the touch screen that item has been found in placed into a shopping cart. The list of items may be provided to the POS/ATM 105 using the reader 106 in order to speed the checkout process. Alternatively, the list provided to the POS/ATM 105 may be used to enforce purchases. For example, the list may specify milk, eggs and bread as items to be purchased. However, the purchaser may have substituted candy bars for bread. Upon checkout, the POS/ATM 105 may note the discrepancy, and either allow an override (e.g., from a parent), or prevent the purchaser from making the purchase of the candy bars.

As can be understood from the above, the card 102 can have many configurations and uses, as the card 102 is configurable to receiving and communicate information to ATM/POS 105 or any other and device capable of communicating wirelessly with the card 102. In addition to the above, the card one or two may be configured to receive offers, advertising, etc. when in range of the reader 106. The card 102 may also be configured to retain personal information such as medical records to provide such information to doctors or other medical personnel should be cardholder become incapacitated.

In some implementations, a handheld device, such as a smart-phone may be used in place of the card 102 as many smart phones have a radio interface such as BLUETOOTH or Wi-Fi (802.11), which would enable communication with the reader 106. The smart phones typically have a display and input device to display information received from the reader 106 and communicate information to the reader 106.

Figure 6:
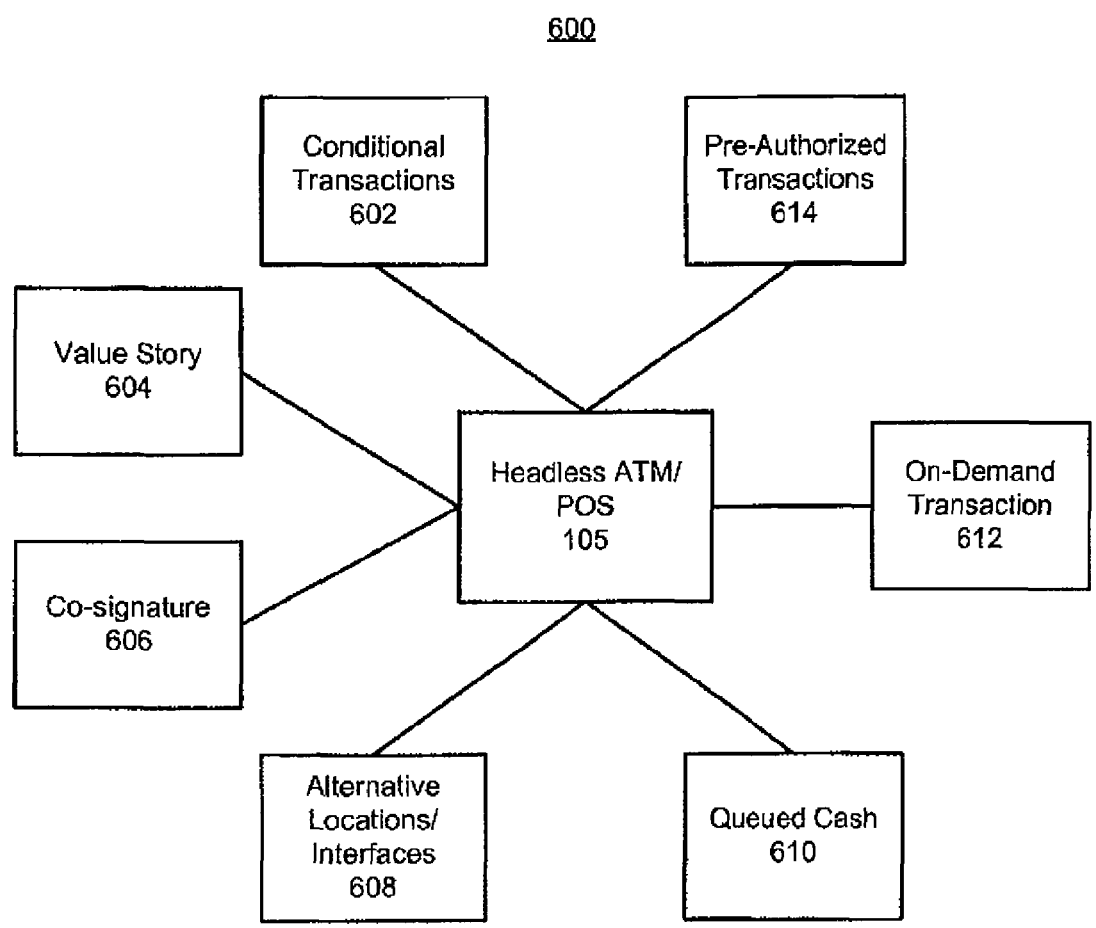
FIG. 6 illustrates exemplary transaction types that may be implemented in the system of FIG. 1 using the ATM/POS and the card of FIG. 2.

FIG. 6 illustrates exemplary transaction types that may be implemented in the system 100 using the headless ATM/POS 105 and the card 102. As illustrated in FIG. 6, such exemplary transaction types may include conditional transactions 602, value story transactions 604, co-signature transactions 606, alternative locations/interface transactions 608, queued cash transactions 610, on-demand transaction 612, and preauthorized transactions 614.

The conditional transactions 602 may include preset transactions based on triggering events. For example, such transactions may include receipt of a retailer coupon, receipt of funds from another source (e.g., rewards funds issued in "store currency" or "financial institution reward currency" t that may be used for specific types of purchases, such as in a particular store, or using a particular card 102), and certain particular transactions (e.g., a specific transaction at specific locations). "Store currency" or "financial institution reward currency" may include incentives where purchases made at a merchant 101 or through a financial institution website may completed using an artificially-valued currency (e.g., $50 charged at a Big Electronics Store POS device yields $60 of Big Electronics Store dollars to make a purchase of electronic equipment from the store. Similarly, a $50 purchase on Bank website results in buying power of, e.g., $75 in Bank dollars to make purchases on the Bank website.). The conditional transactions 602 may also include preset transactions based on dates and/or times. For example, conditional transactions may be cash transactions to a housekeeper or other service provider who utilizes the card 102 to withdraw cash as payment for services rendered.

Value story transactions 604 include transactions that take advantage of certain aspects of the flexible nature of the card 102. A replacement card 102 may be provided and activated for use by the customer immediately without waiting for a new ATM card to be processed and delivered. The card 102 may be acquired from any merchant 101 or financial institution 116*a-n*, and activated for use by the customer. The card 102 may provide convenience aspects such as an ATM/POS 105 where no ATM may presently exist. The customer may go to a merchant 101 having an ATM/POS 105 and make a withdrawal within the system 100, whereas conventionally the merchant 101 would likely not have a conventional ATM machine on premises. In addition, the card 102 may provide access to emergency funds as device institution 116*a* may authorize the card 102 access emergency funds that would otherwise not be accessible. Social networking aspects are possible, such as merchant feedback about a purchase that may be provided using the card 102. The card 102 may be used to prevent price gouging. For example, the card 102 may be presented to make a purchase from vendor X. During the transaction, information may be displayed in the display 210 that the price is too high, and that vendor Y is selling the same product for 50% less. The card can also be used to provide historical transactional information while at a merchant in order to reinforce buying habits. For example, the card may show that the customer last bought Frozen Pizza Brand X to prompt the customer to buy that brand again or to provide the merchant with immediate feedback that the customer did or did not like the product they bought last time.

Co-signature transactions 606 may include transactions by a first account holder that a second account holder authorizes. Such co-signature transactions 606 may be useful to businesses, etc., to authorize withdrawals over a threshold amount, approval of funds transfers to outside accounts, and authorizing payments to vendors to ensure that only legitimate vendors receive funds from the account tied to the card 102. This also provides two signature capabilities where the signatorees are geographically dispersed. The transaction would first be approved by the first signature and then be held in suspense by the network provider awaiting the activation of the secondary signatoree's card once it was presented at a terminal. The terminal would prompt the secondary individual that they have transactions awaiting approval and complete the transaction.

Alternative locations/interfaces 608 are transactions whereby a customer approaches an ATM/POS 105 and begins a communication session therewith. The ATM/POS 105 may suggest a different ATM/POS 105 having different capabilities to complete a requested transaction and/or the ATM/POS 105 may reconfigure its interface to a format more appropriate for the customer and order the card a 102. For example, a disabled customer may be unable to access an ATM/POS 105. Using the RF module 220, the card 102 may communicate with the reader 106 whereby the ATM/POS 105 may suggest an accessible ATM/POS 105 in a different location. In some implementations, the card 102 may be provided with capabilities whereby additional functionalities are provided if in contact with a surface computing device. The ATM/POS 105 may reconfigure its interface from an RF-based interface to a surface-based interface in order to provide maximum capabilities to the customer carrying the card 102.

Queued cash transactions 610 are transactions where a customer is preauthorized to obtain certain features and benefits. The card 102 may be a vehicle for authentication of the customer at retailers, financial institutions, travel destinations, etc., whereby the customer is provided a higher-level service, passes for events, discounts, or any other benefit that may be bestowed upon the customer in accordance with a particular location.

On-demand transactions 612 are transactions that are specific to a merchant 101 and/or the ATM/POS 105. On-demand transactions 612 may only be completed at the merchant 101 or the ATM/POS 105, and may be requested for security purposes, transferring funds to a specific person, etc. For example, the card 102 may be used as a meal plan card at State University, etc.

Preauthorized transactions 614 may include transactions based on origination and/or transaction and security measures. Transactions based on origination may include those initiated by an account holder, initiated by recipient, or set up at a personal computer and/or a mobile device prior to taking place. Transactions based on security measures may be those having a specific time to live duration, having a specific location or boundary of locations, having a pre-shared key arranged in advance or through and out of band notification (e.g., an SMS message, e-mail, etc.), and those paired to specific mobile device associated with a person or persons. In some implementations, a one-time PIN may be created for a specific transaction in order to prevent fraudulent use of the card 102.

Thus, the system 100 including the card 102 and the ATM/POS 105 may have many expandable uses in combination with the above described operational flows, or in related operational flows.

Figure 7:
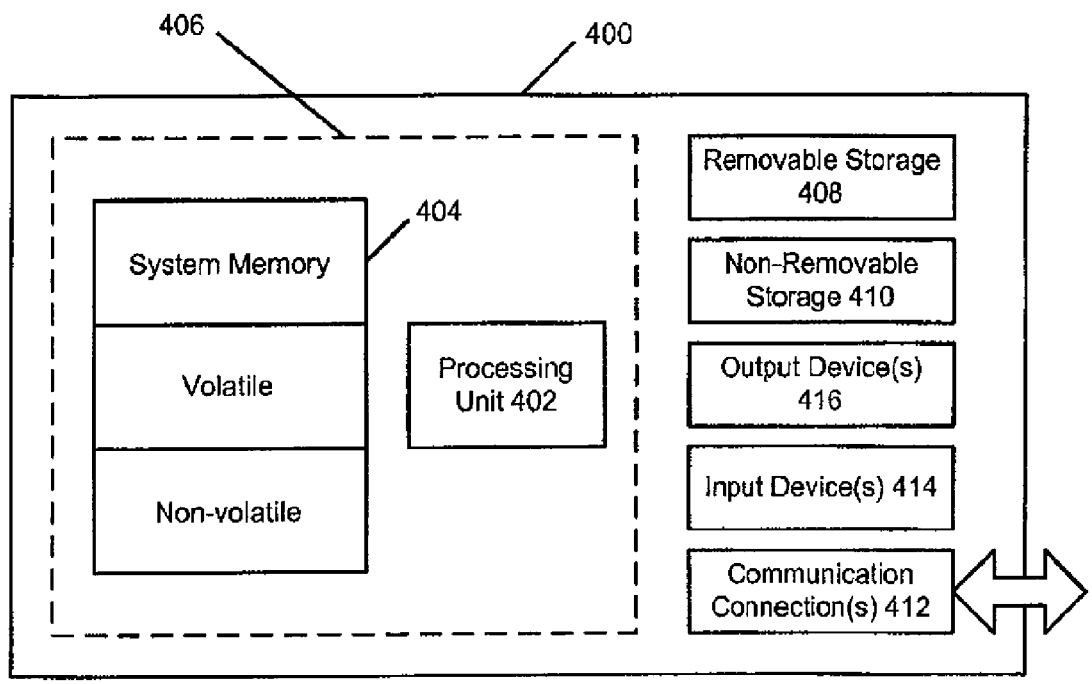
FIG. 7 is a block diagram of an example computing environment that may be used in connection with implementations of the subject matter described herein.

The subject matter described herein may be implemented through the use of a computer system, or other type of device that has some computing mechanism(s). FIG. 7 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an example system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by computing device 700 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 704, removable storage 708, and non-removable storage 710 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may also contain communications connection(s) 712 that allow the device to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 700 may also have input device(s) 714 such as keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

What is claimed is:

1. A non-transitory computer-readable medium comprising computer-readable instructions executable by a processing resource to:
   authenticate a handheld device with a point-of-sale device;
   provide transaction information, including a unique identifier of the transaction, to the handheld device;
   confirm the transaction at the handheld device; and
   complete the transaction at the point-of-sale device,
      wherein the transaction is completed without the use of an input device or display of the point-of-sale device.

2. The non-transitory computer-readable medium of claim 1, further comprising instructions executable to establish a communications link between the handheld device and the point-of-sale device over a radio frequency (RF) interface.

3. The non-transitory computer-readable medium of claim 1, wherein the point-of-sale device is a headless point-of-sale device.

4. The non-transitory computer-readable medium of claim 1, wherein the handheld device has predetermined characteristics set in advance of the transaction that defines the type of transactions for which the handheld device may be used.

5. The non-transitory computer-readable medium of claim 4, wherein the predetermined characteristics are configurable to be altered in real-time at a financial institution associated with a user of the handheld device.

6. The non-transitory computer-readable medium of claim 1, further comprising instructions executable to configure the handheld device to authenticate with the point-of-sale device in accordance with a merchant category.

7. The non-transitory computer-readable medium of claim 1, wherein the transaction comprises at least one of a conditional transaction, a pre-authorized transaction, an on-demand transaction, a value story transaction, a co-signature transaction, a queued cash transaction, an alternative location transaction, and an alternative interface transaction.

8. A system, comprising:
   a processing resource; and
   a memory resource coupled to the processing resource and storing thereon non-transitory computer readable instructions executable by the processing resource to:
      determine a characteristic of a transaction between a point-of-sale device and a handheld device;
      present the characteristic and a unique transaction identifier of the transaction on a display of the handheld device;
      determine whether the characteristic meets a criteria specified by the predetermined authorization associated with the handheld device;
      in response to the handheld device being declined authorization for the characteristic, terminate the transaction; and
      in response to the handheld device being authorized for the characteristic, complete the transaction at the point-of-sale device,
         wherein the transaction is completed in a headless manner such that there is no interaction between a user of the handheld device and an input device or display of the point-of-sale device.

9. The system of claim 8, wherein the characteristic of the transaction is at least one of a geographic location of the transaction and an amount of the transaction.

10. The system of claim 8, wherein the computer readable instructions are executable by the processing resource to provide an authorization to the user to complete the transaction.

11. The system of claim 8, wherein the computer readable instructions are executable by the processing resource to authenticate the handheld device at the point-of-sale device, wherein the authentication is performed using information stored locally on the handheld device.

12. A system, comprising:
   a processing resource; and
   a memory resource coupled to the processing resource and storing thereon non-transitory computer readable instructions executable by the processing resource to:
      authenticate a card with an automated teller machine (ATM) machine over a communication link;
      provide, to a display of the card, a request to authenticate a cardholder;
      receive an identifier to authenticate the cardholder and a unique transaction identifier to identify a transaction, the cardholder, and a transaction merchant; and complete the transaction at the ATM in accordance with authorizations associated with the card and the cardholder, wherein the transaction is completed without physical interaction with a display of the ATM by the cardholder.

13. The system of claim 12, wherein the card is a handheld device comprising a display and an input device to display information communicated between the card and the ATM.

14. The system of claim 12, wherein the computer readable instructions are executable by the processing resource to authenticate the card using a geographic location of the ATM.

15. The system of claim 12, wherein the transaction type is configurable by an account holder of an account associated with the card.

16. The system of claim 12, wherein the computer readable instructions are executable by the processing resource to ascertain a transaction type to be completed at the ATM.

17. The system of claim 16, wherein the transaction type comprises at least one of a conditional transaction, a value story transaction, a co-signature transaction, an alternative location transaction, an alternative interface transaction, a queued cash transaction, and on-demand transaction, and a preauthorized transaction.

18. The system of claim 12, wherein the computer readable instructions are executable by the processing resource to override the characteristics with a predetermined identifier entered into a touch-sensitive input in the display area of the card.

19. The system of claim 12, wherein the computer readable instructions are executable by the processing resource to update a configuration of the card during communication with the ATM.

20. The system of claim 12, wherein the computer readable instructions are executable by the processing resource to receive from the card information contained within a database on the card to the ATM.

* * * * *